A. B. CAREY.
CARTRIDGE FEED FOR FIREARMS.
APPLICATION FILED JUNE 19, 1907.
924,732.
Patented June 15, 1909.
17 SHEETS—SHEET 2.
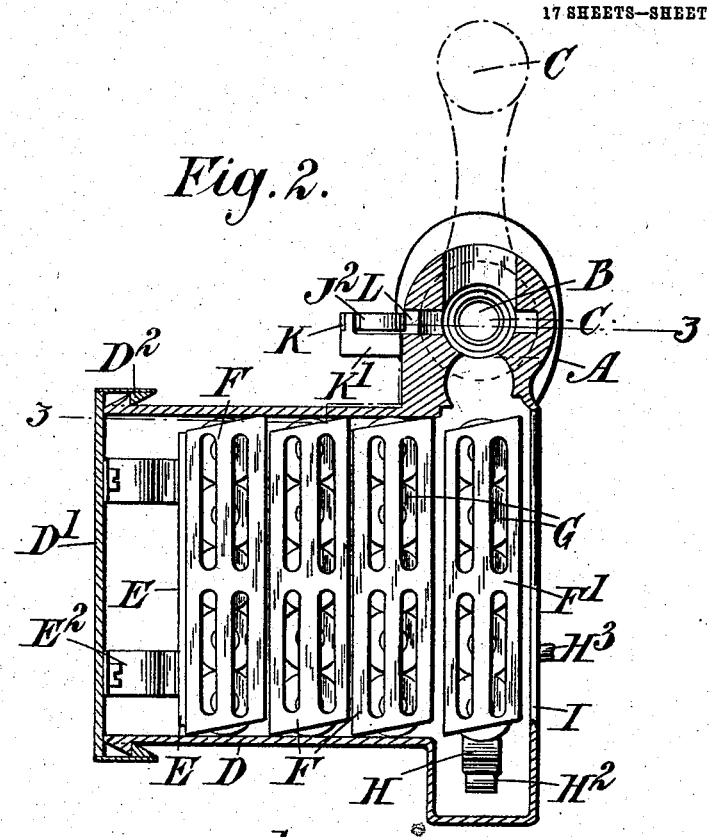
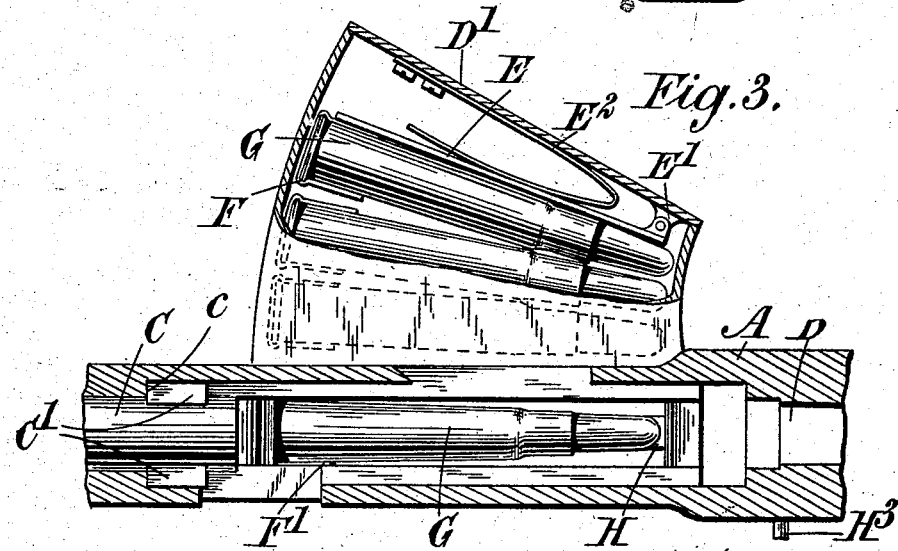

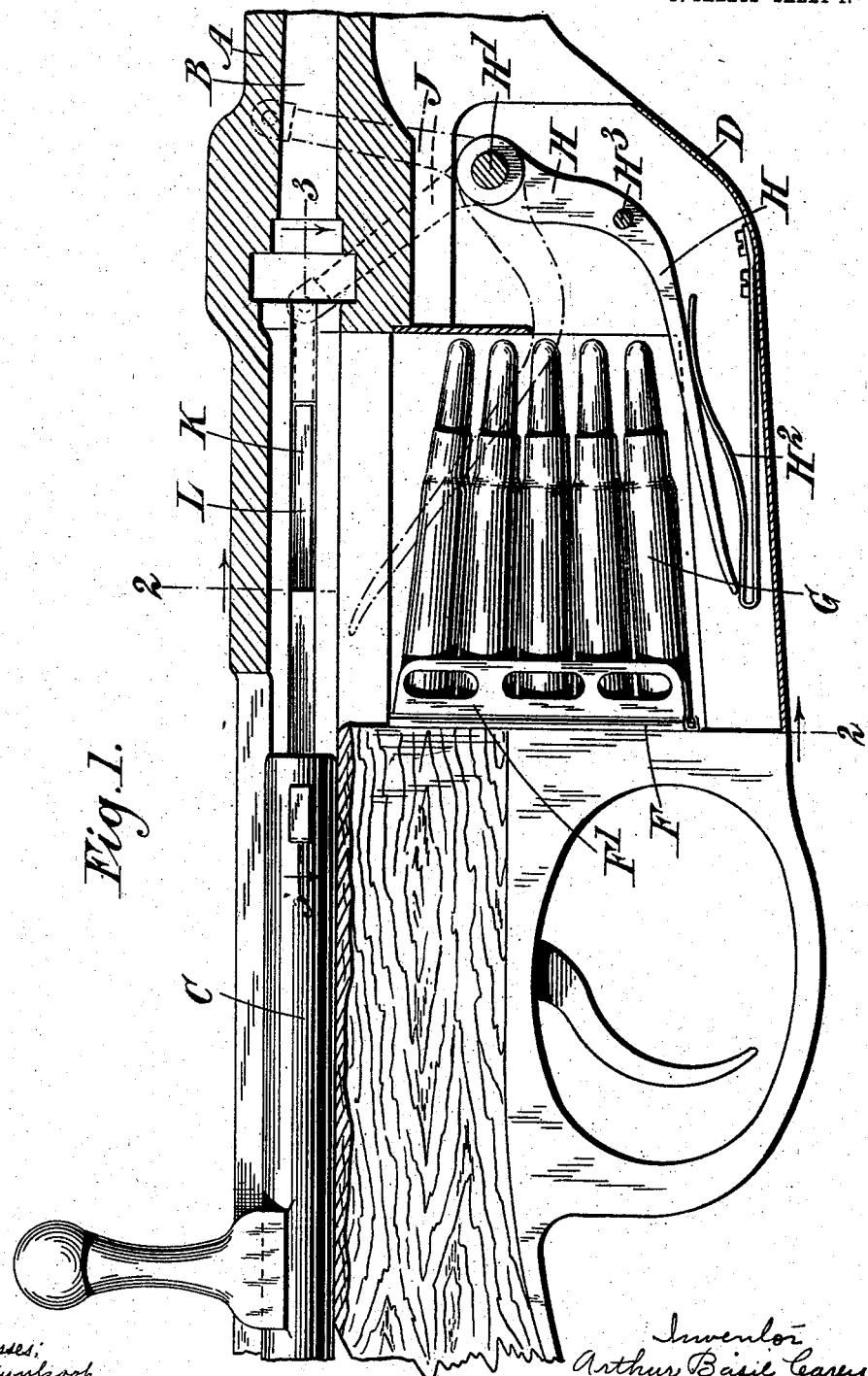

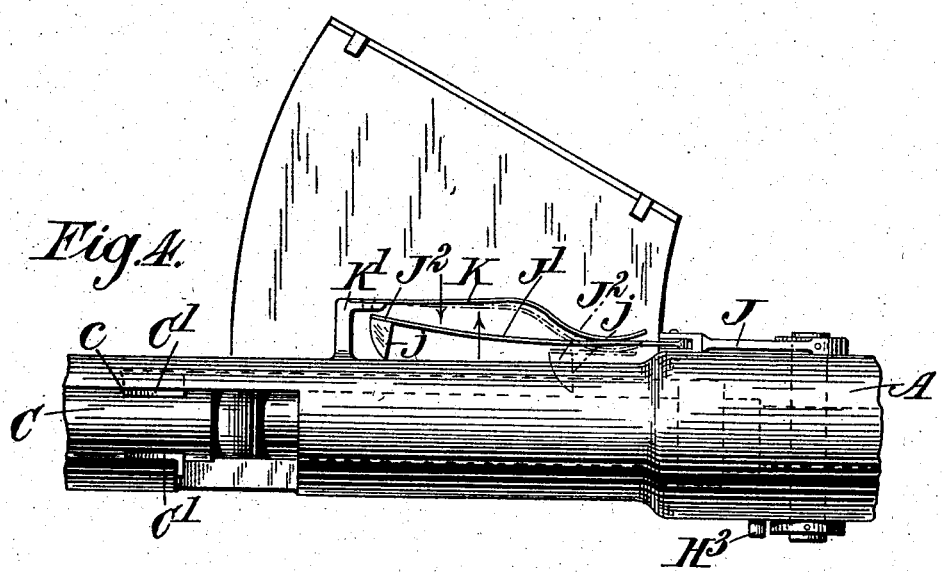

A. B. CAREY.
CARTRIDGE FEED FOR FIREARMS.
APPLICATION FILED JUNE 19, 1907.
924,732.
Patented June 15, 1909
17 SHEETS—SHEET 4.
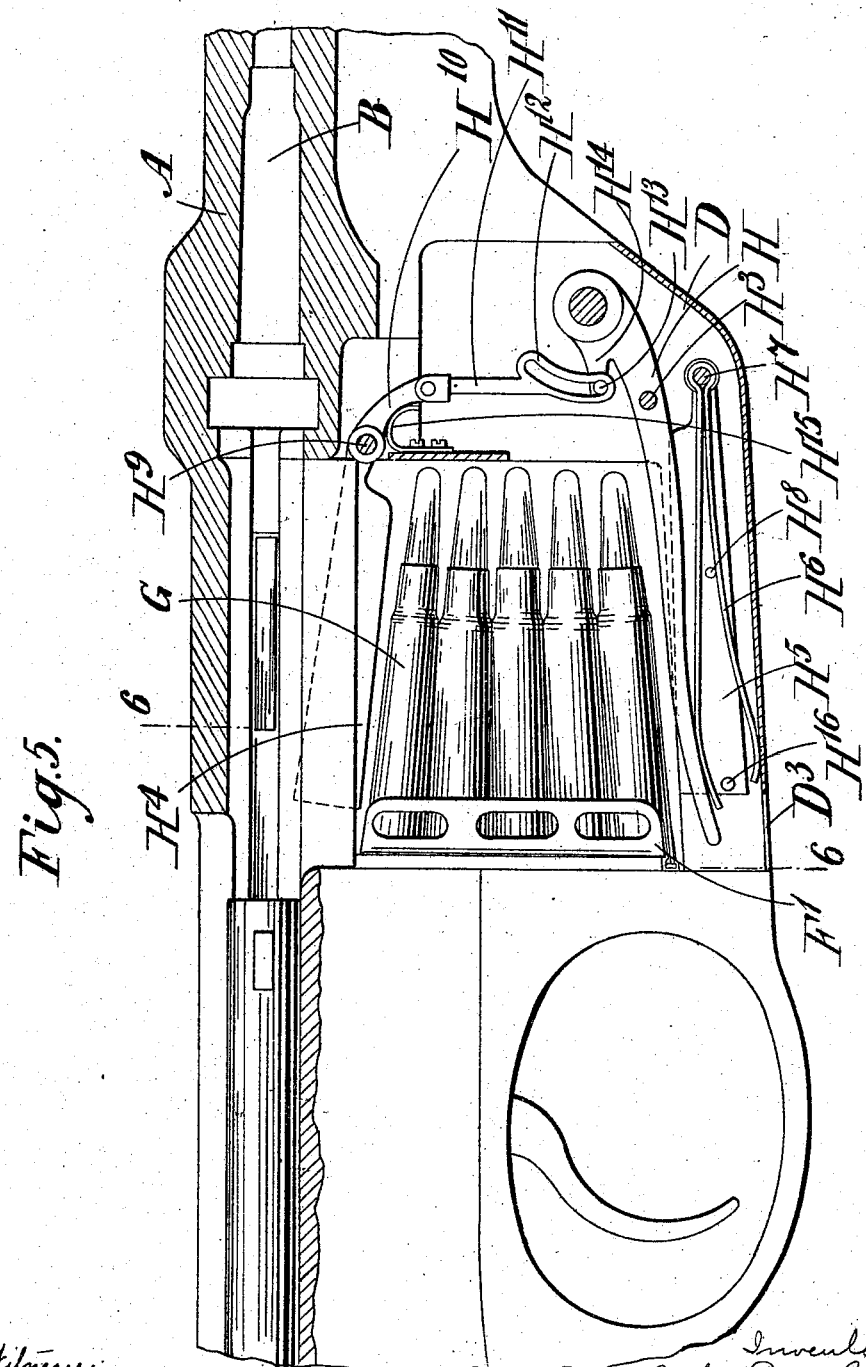

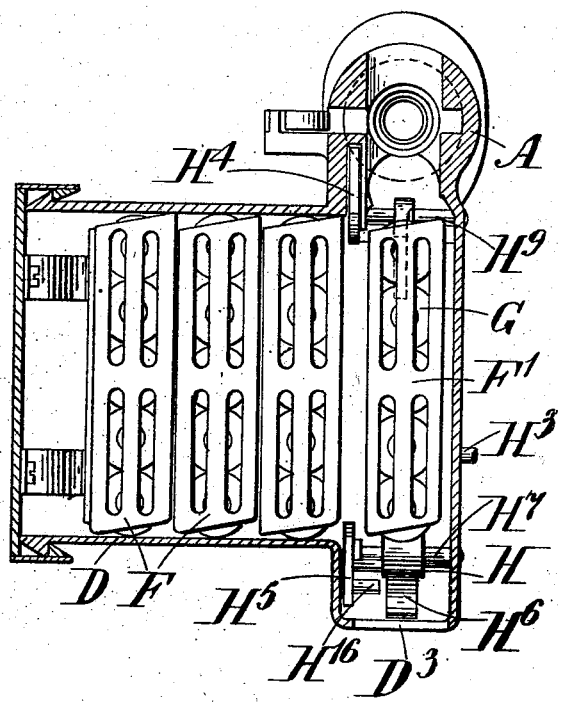

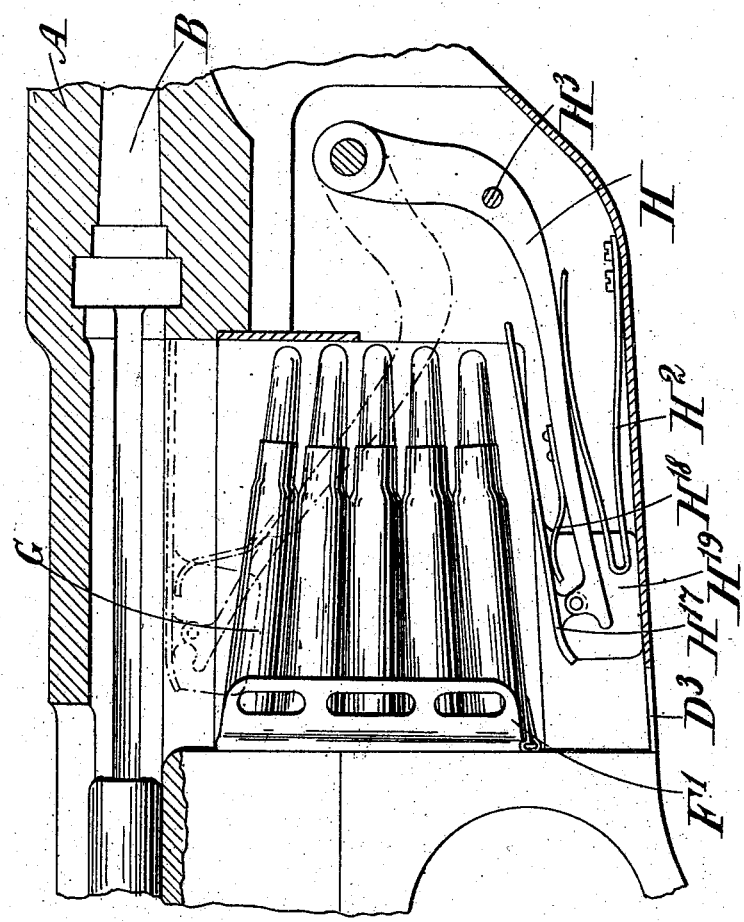

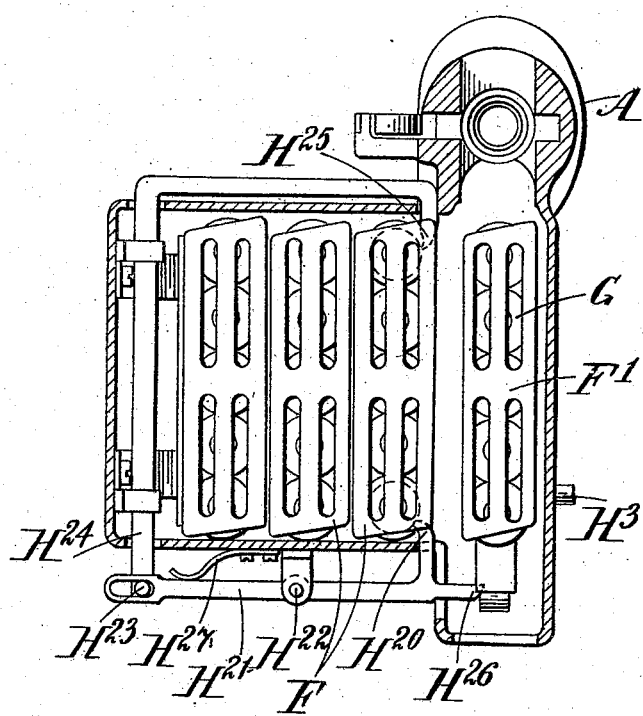

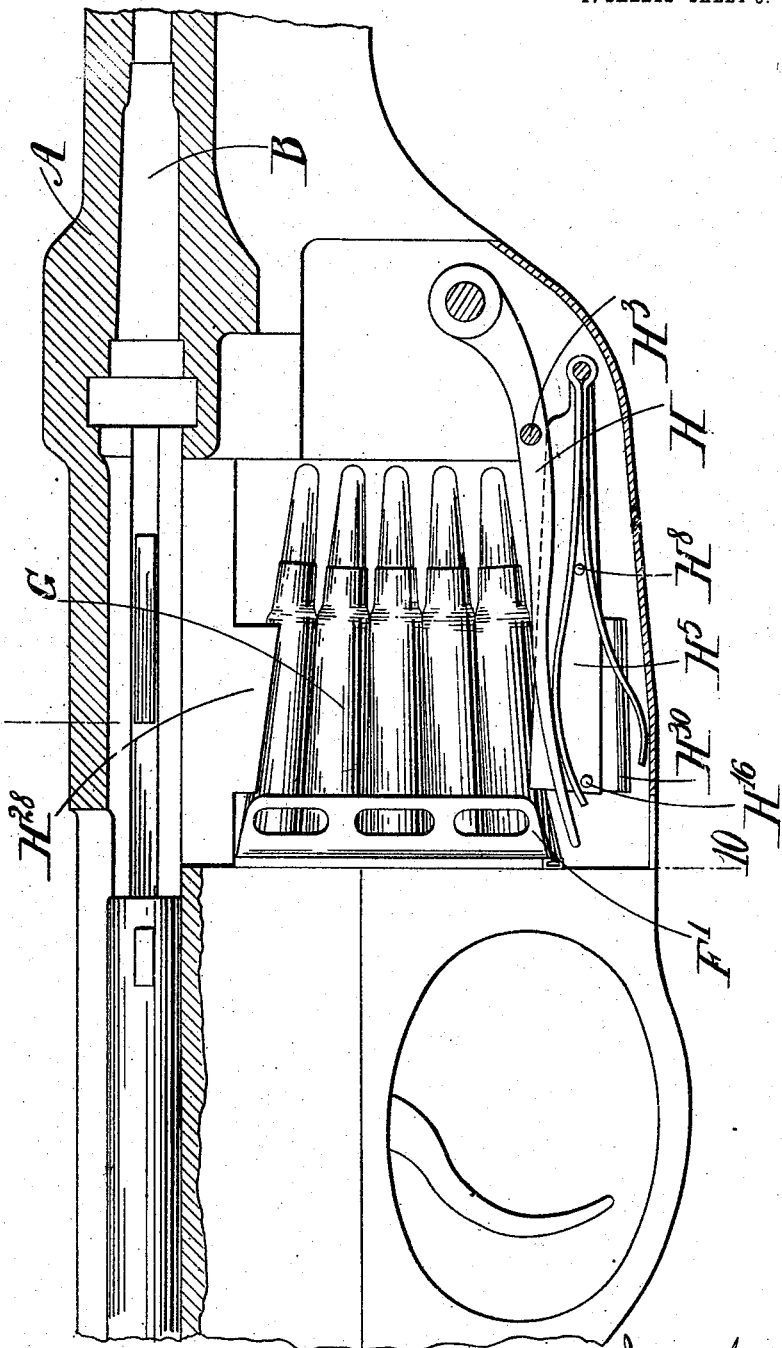

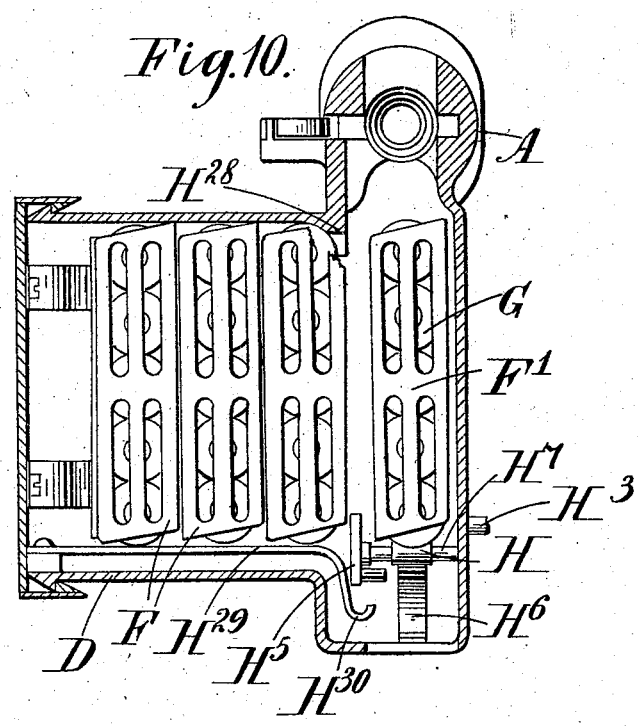

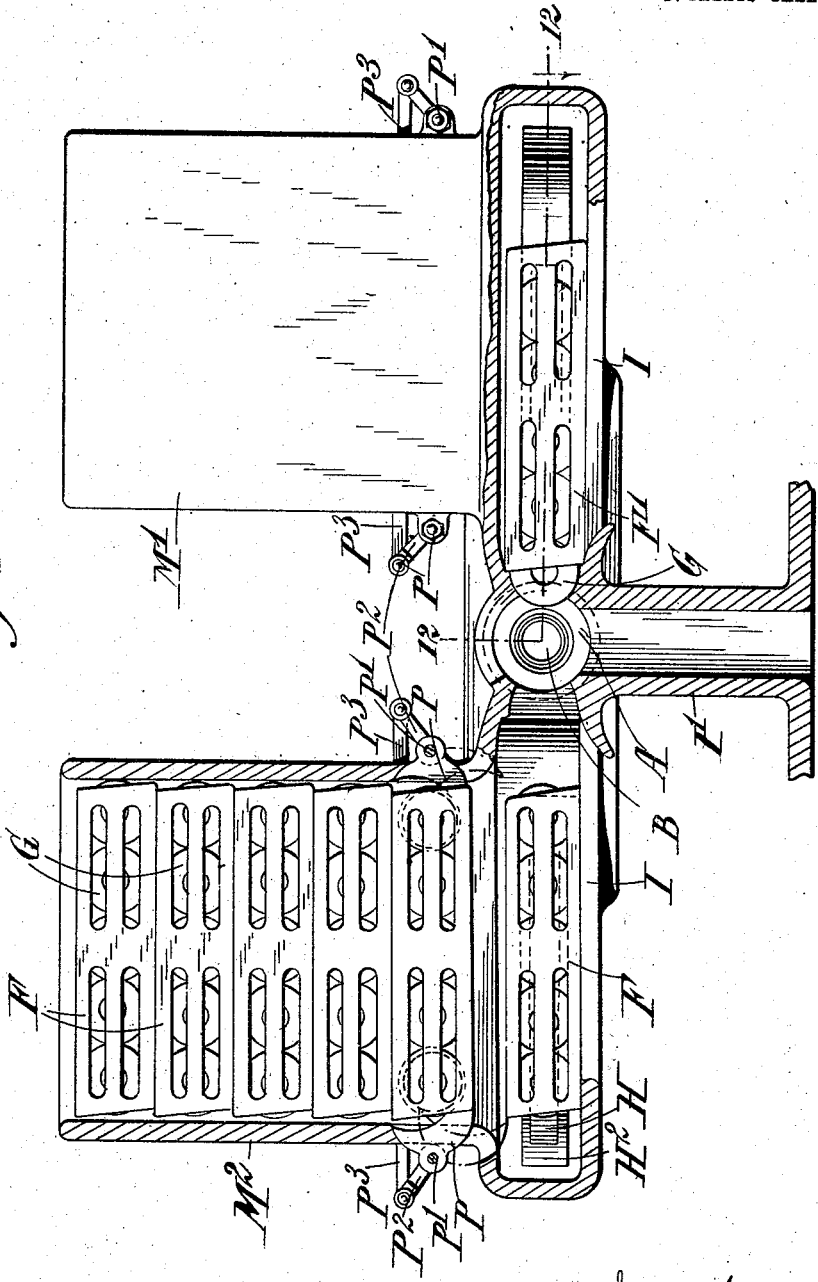

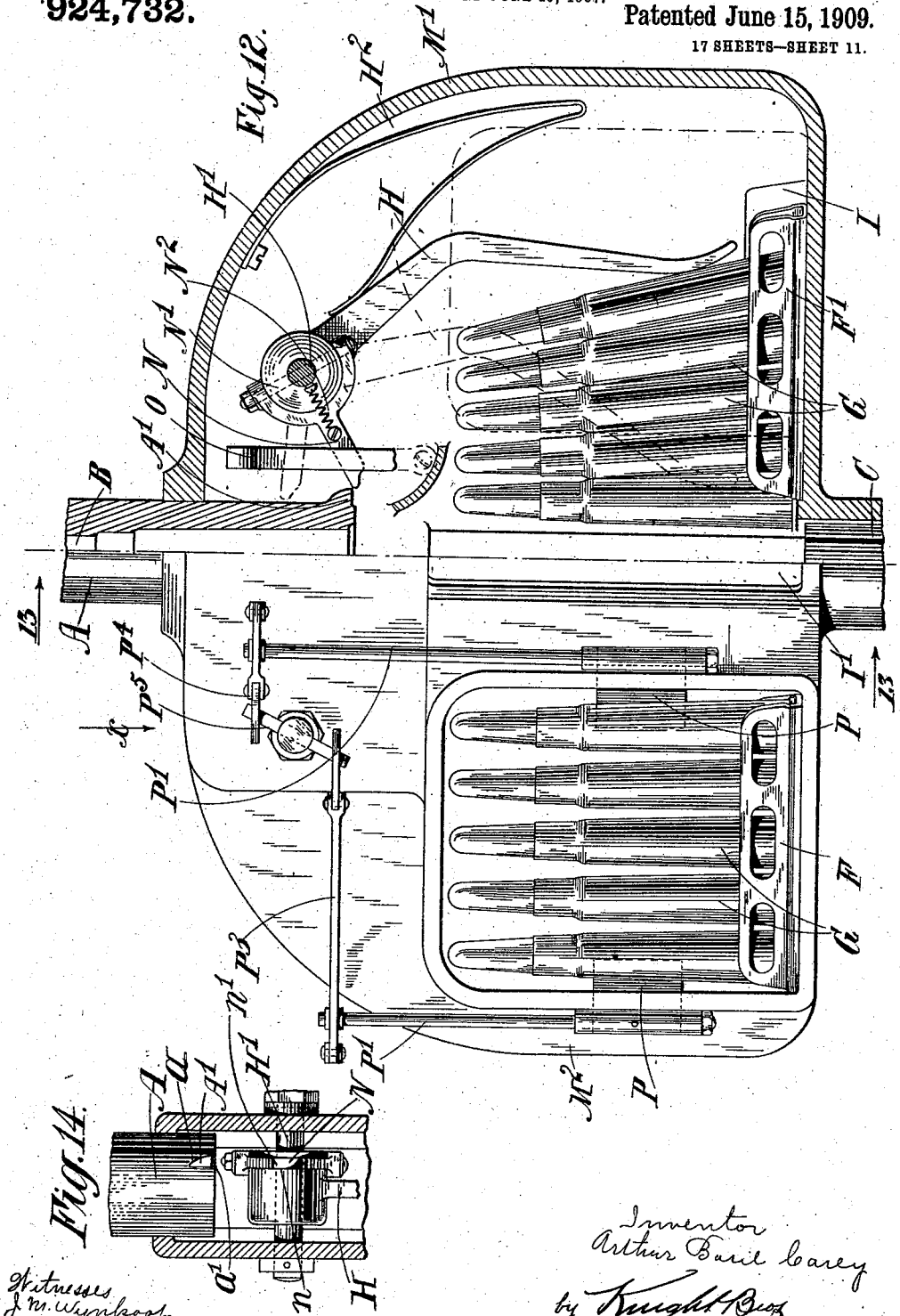

A. B. CAREY.
CARTRIDGE FEED FOR FIREARMS.
APPLICATION FILED JUNE 19, 1907.
924,732.
Patented June 15, 1909.
17 SHEETS—SHEET 12.
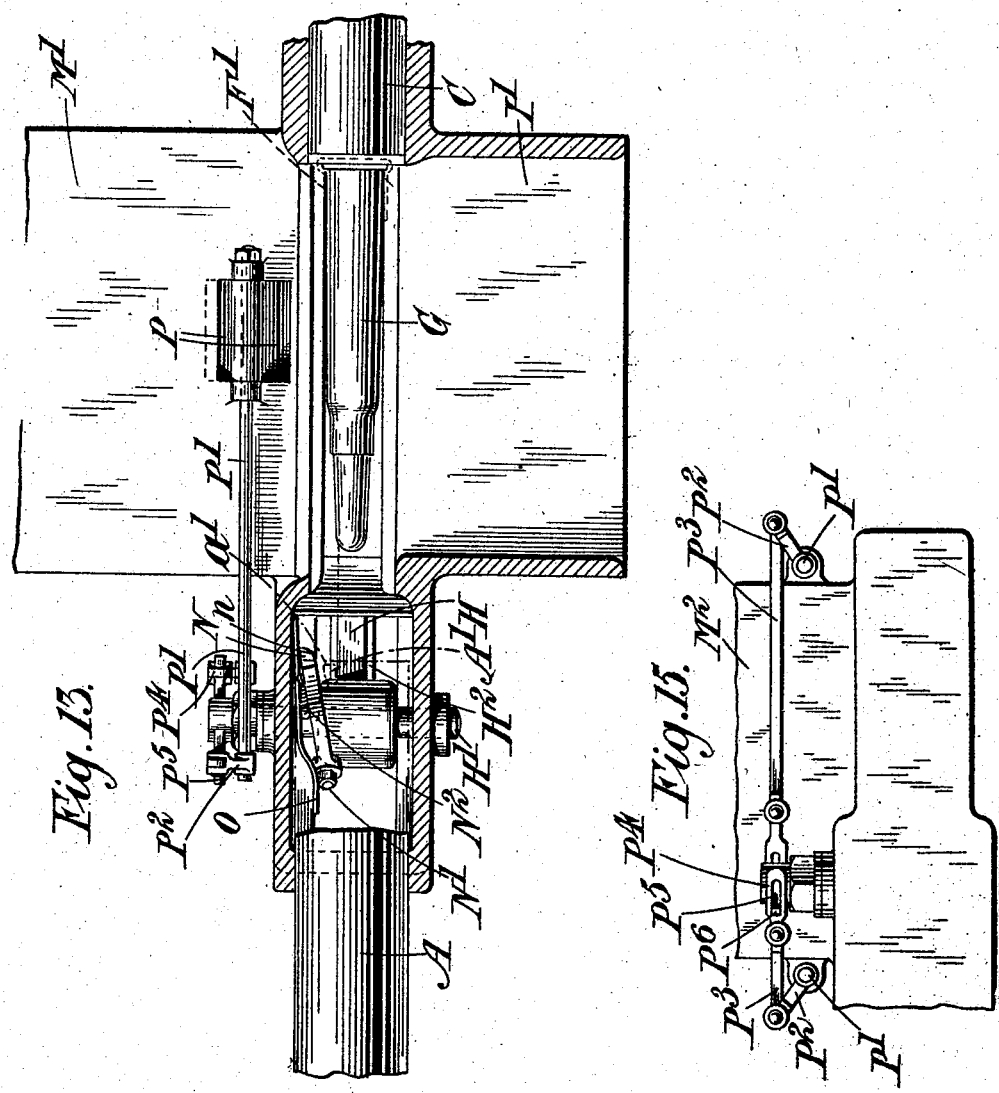

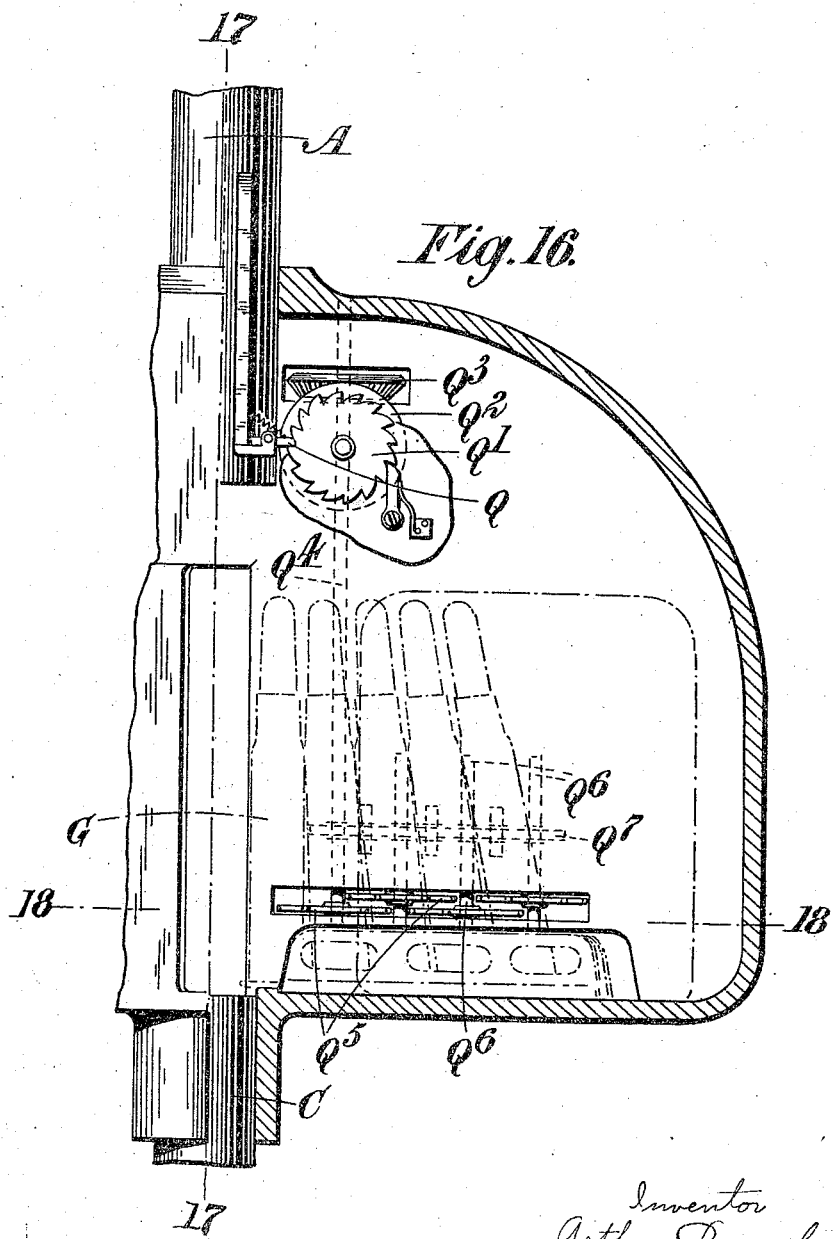

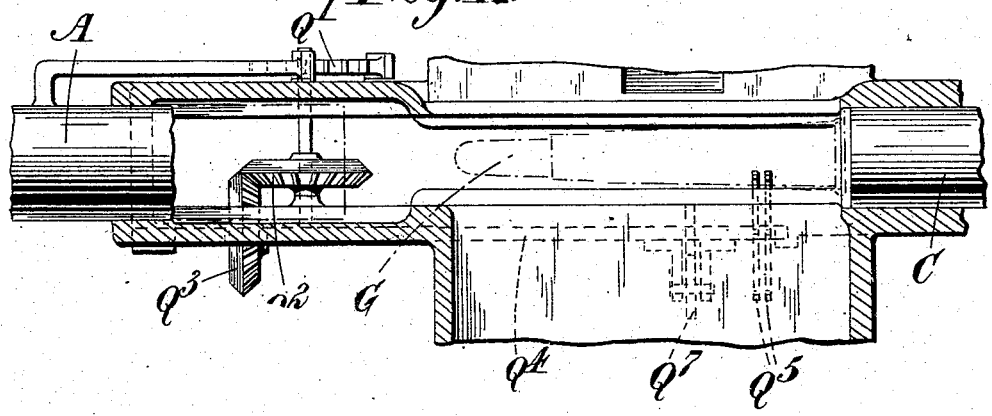
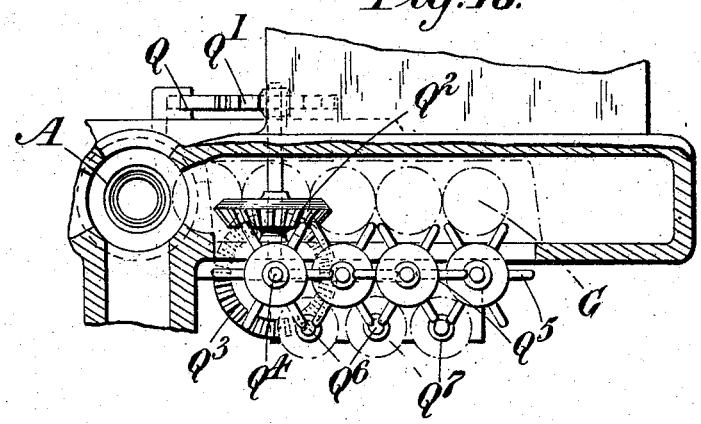

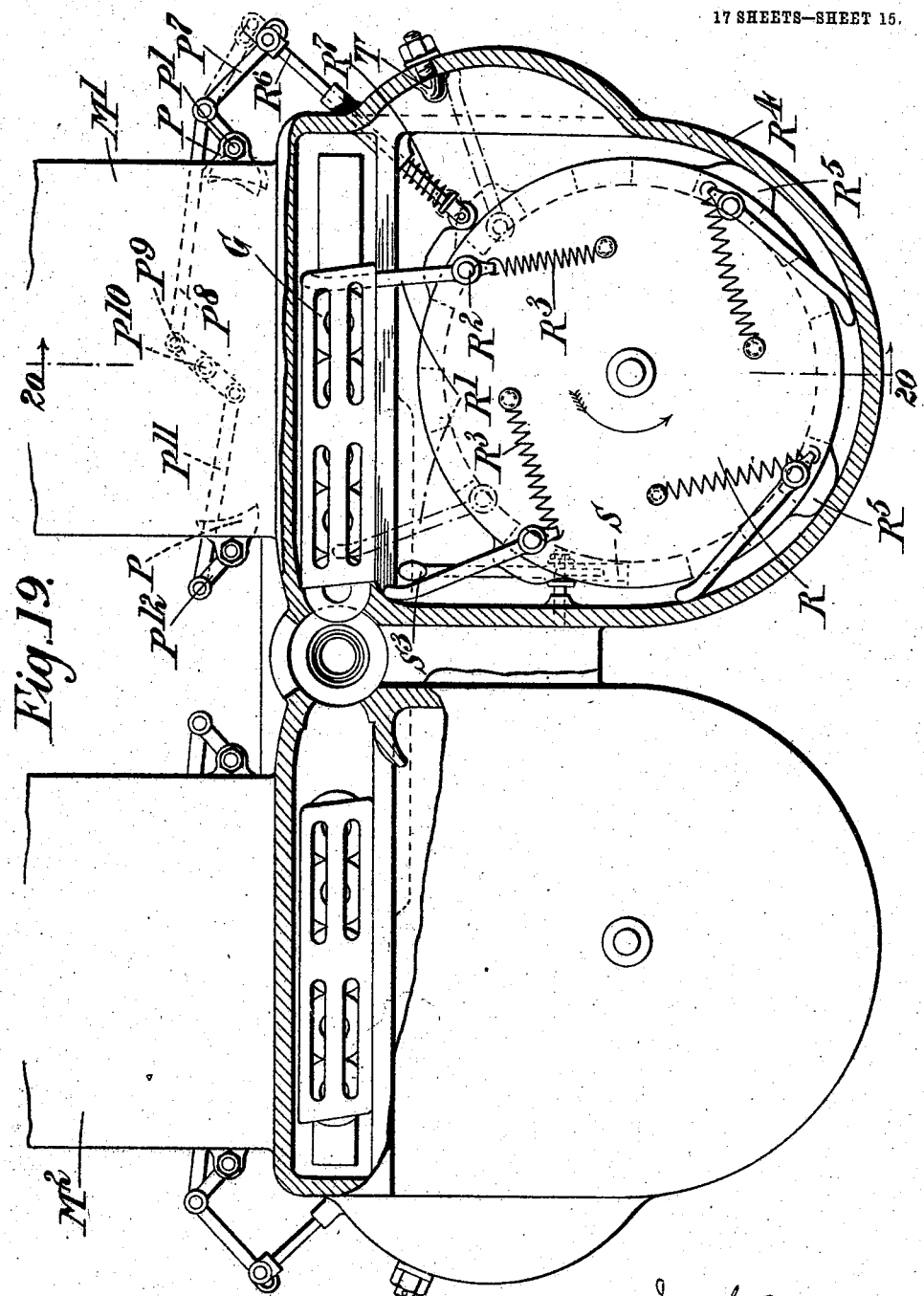

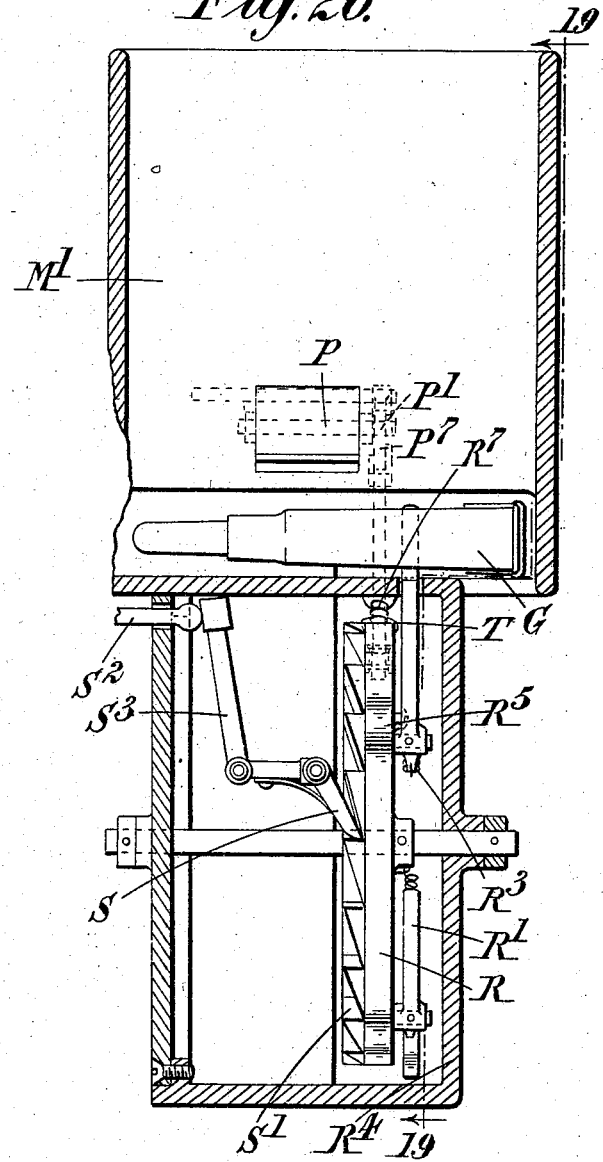

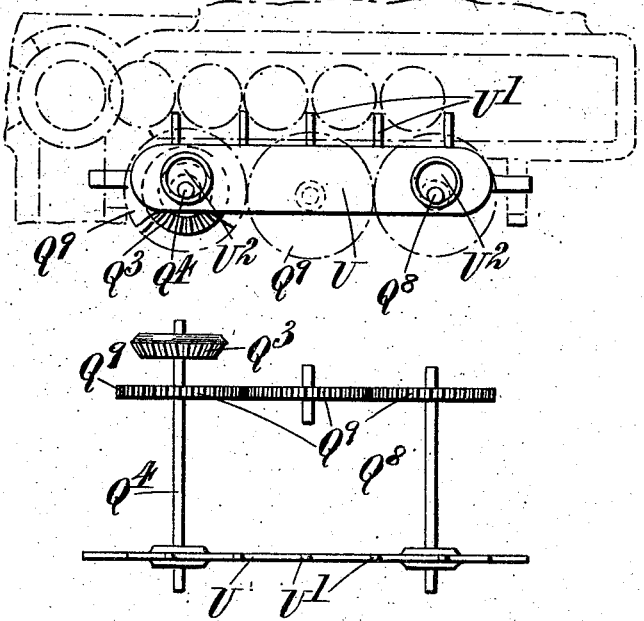

UNITED STATES PATENT OFFICE.

ARTHUR BASIL CAREY, OF HYTHE, ENGLAND.

CARTRIDGE-FEED FOR FIREARMS.

No. 924,732.   Specification of Letters Patent.   Patented June 15, 1909.

Application filed June 19, 1907. Serial No. 379,776.

*To all whom it may concern:*

Be it known that I, ARTHUR BASIL CAREY, a subject of the King of England, residing at Hythe, in the county of Kent, England, have invented certain new and useful Improvements in Cartridge-Feeds for Firearms, of which the following is a specification.

This invention relates to improvements in cartridge feeds for fire-arms, such as magazine rifles, machine-guns and the like, and consists in improved means whereby the cartridges may be fed successively to the chamber.

According to this invention, a cartridge feed is employed comprising a stationary magazine or magazines adapted to contain a plurality of independent clips, chargers or packages, each holding a group of cartridges, and means to produce relative motion between the clips, chargers or packages and the gun-barrel for the purpose of getting the cartridges into a position to be caught by, for example, the breech-bolt, and forced into the chamber of the weapon. By the employment of this invention, the weapon may be operated to fire away in succession the contents of two or more independent clips or the like, which clips can be put simultaneously into the magazine without need for preliminary removal of the cartridges from the clips, and also without requiring that the ammunition shall be put up in any form that is special to machine-gun work.

The cartridges may be contained in clips, chargers or packages holding five each, such as are usually employed for infantry purposes.

Further improvements comprised within the invention will be evident from the following description taken in connection with the accompanying drawings, in which—

Figure 1 is a sectional elevation of part of a magazine rifle showing one embodiment of the invention; Fig. 2 is a sectional elevation on the line 2—2 of Fig. 1; Fig. 3 is a part plan taken in section on the line 3—3 of Fig. 2, and Fig. 4 is a part plan showing a detail. Fig. 5 is a sectional elevation of part of a magazine rifle, showing another embodiment of the invention; Fig. 6 is a section on the line 6—6 of Fig. 5; Fig. 7 is a sectional elevation of part of a magazine rifle showing another embodiment of the invention; Fig. 8 is a section through the magazine of a rifle, showing another embodiment of the invention. Fig. 9 is a sectional elevation of part of a magazine rifle, showing another embodiment of the invention. Fig. 10 is a section on the line 10—10 of Fig. 9. Fig. 11 is an elevation partly in section of the rear end of a machine gun showing another embodiment of my invention; Fig. 12 is a plan, the right hand half of which is a section on the line 12—12 of Fig. 11; Fig. 13 is a section on the line 13—13 of Fig. 12; Fig. 14 is a detail, and Fig. 15 is a part end elevation of the left hand side of Fig. 12 taken in the direction of the arrow X. Fig. 16 is a plan, partly in section of a part of a machine gun showing another embodiment of my invention; Fig. 17 is a section on the line 17—17 of Fig. 16. Fig. 18 is a section on the line 18—18 of Fig. 16. Fig. 19 is an elevation partly in section of the rear end of a machine gun showing another embodiment of my invention; Fig. 20 is a section on the line 20—20 of the same. Fig. 21 shows, partly in section, another embodiment of my invention, and Fig. 22 is a part plan of the same.

Like letters indicate like parts throughout the drawings.

Referring to Figs. 1 to 4, which show one embodiment of the invention as applied to a magazine rifle, A is the barrel of the rifle, B the chamber, C the breech bolt, $C^1$ the resisting lugs thereon, and D a magazine. The cartridge-containing clips, such as are used for infantry purposes and holding five cartridges each, are placed in the magazine D. The magazine is provided with a cover $D^1$ having spring clips $D^2$. A plate or the like E is pivoted at $E^1$ on the inner side of the cover. A spring $E^2$ is situated between the plate E and the cover $D^1$ and this spring tends to force the clips F containing the cartridges G toward the position occupied by the particular clip $F^1$. The part of the magazine now indicated as occupied by the clip $F^1$ will be referred to hereinafter as the "loading chamber" as the cartridges contained in the clip occupying this position are those which are about to be immediately fed to the chamber of the rifle. A lever H is pivoted at $H^1$ and pressed upward by a spring $H^2$. The lever H pressing on the cartridges in the clip $F^1$ tends to force them upward out of the clip. On the breech bolt C being moved forward to close the breech it catches the edge of the top cartridge and forces it into the firing chamber in a manner exactly similar to that usually employed in magazine bolt rifles. After all the cartridges in the clip are fired the clip is ejected through an opening I. The next clip of cartridges then tends to come into the loading chamber but is prevented from so doing by the presence of the lever H in the position shown in dotted lines in Fig. 1. In order to allow the next clip to come into the loading position, it is therefore necessary to return the lever H to the position shown in full lines in Fig. 1 and for this purpose a pin or handle $H^3$ may be attached to the lever H so that the latter can be conveniently depressed by the thumb.

Instead of returning the lever H by hand as just described, this operation may be done automatically in the following manner:—An arm J (Figs. 1 and 4) is pivoted at $H^1$ so as to move with the lever H; attached to the arm J is a spring $J^1$ having a projection $J^2$; shaped substantially as shown, adapted to pass through a slot L cut in the side of the loading chamber of the rifle. A spring or guide K is supported on a suitable bracket such as $K^1$ attached to the rifle. The spring $J^1$ tends to move outward and the spring K inward with respect to the barrel, as is indicated by the small arrows. After all the cartridges in a given clip have been fired the lever H reaches the position shown in dotted lines in Fig. 1, and consequently, and also on account of the particular shape of the spring K the projection $J^2$ on the spring $J^1$ attached to the arm J occupies the position shown in dotted lines in Fig. 4; so that on the next rearward movement of breech bolt C to open the breech, one of the resisting lugs $C^1$ catches the projection $J^2$ and pulls, through the spring $J^1$ and arm J, the lever H back into the position shown in full lines in Fig. 1. The next clip of cartridges then comes into position in the loading chamber. To prevent the parts $J^2$ and $C^1$ from freeing themselves too early in their rearward movement, they have inclined engaging faces $j$ and $c$ as shown.

In the modification of the magazine rifle already described, the empty clips are ejected through a slot I in the side of the magazine. Instead of this, the clips may be allowed to drop through a slot in the base of the magazine and in this case a cut-off must be provided to prevent the next clip of cartridges being forced on to the empty clip and so jam the latter in the magazine. In the modifications about to be described (illustrated in Figs. 5 to 10) various forms of such cut-off devices are shown.

Referring to Figs. 5 and 6, the magazine rifle in this case is provided with two cut-offs one $H^4$ at the top and the other $H^5$ at the bottom of the magazine. The loading lever H is operated by a double spring $H^6$ supported on a spindle $H^7$ about which the cut-off $H^5$ rotates. The cut-off $H^5$ is provided with a pin $H^8$ which passes between the two portions of the double spring $H^6$. On depressing the loading lever H by means, for example, of the handle $H^3$, the double spring $H^6$ is flattened down to the bottom of the magazine and the pin $H^8$ on the cut-off $H^5$ is consequently forced down with it. On releasing the loading lever H, the cut-off is raised by the under half of the spring and the loading lever by the upper half. The upper cut-off $H^4$ is pivoted at $H^9$ and is provided with an arm $H^{10}$ to the end of which is pivoted the end of a link $H^{11}$. The other end of the link $H^{11}$ is provided with a slot $H^{12}$ in which can move a pin $H^{13}$ on the end of an arm $H^{14}$ on the loading lever H. The link $H^{11}$ and slot $H^{12}$ are arranged in such a position that a pull is exerted on the arm $H^{10}$ of the cut-off only when the loading lever is near its lowest point that is to say at the moment when the loading lever is in such a position that a new clip of cartridges can come into place. The arm $H^{10}$ of the cut-off $H^4$ is pressed upward by a spring $H^{15}$ and consequently the cut-off always tends to come into operative position. A slot in the side of the barrel is shown into which the cut-off can be raised when the next clip of cartridges is coming into position. The empty clips fall through a slot $D^3$ in the base of the magazine D. A pin $H^{16}$ may be provided on the end of the cut-off $H^5$ to prevent the lower end of the clip moving forward as the cartridges are fed into the chamber of the rifle.

In the modification of this invention shown in Fig. 7 a device is employed for keeping the cartridges in their horizontal position so that the nose of the bullet rises level with the loading chamber and a cut-off device is also provided. The loading lever H is pressed upward by a spring $H^2$, as described in connection with the first modification of a magazine rifle constructed according to this invention. Pivoted to the end of the loading lever is a platform $H^{17}$ having its end rounded so that the rim of the cartridge may ride over it. A spring $H^{18}$ is provided beneath this platform, as shown. As already referred to, this platform brings the nose of the bullet of the cartridge level with the chamber of the rifle. The position of the platform $H^{17}$ when the loading lever has risen to its highest position is shown in the chain lines in Fig. 7. The side of the platform $H^{17}$ has a projection $H^{19}$ which acts as a cut-off, the empty clips falling through a slot $D^3$.

In the modification shown in Fig. 8, bottom and top cut-offs are provided, these being in the form of clips which engage the cartridges. The lower clip is a projection $H^{20}$ on an arm $H^{21}$ pivoted about $H^{22}$. Working in a slot on the end of the arm $H^{21}$ is a pin $H^{23}$ on the end of an L-shaped arm $H^{24}$, the other end $H^{25}$ of this L-shaped arm forming the upper clip. The arm $H^{21}$ is provided with an extension H²⁶ which engages with the loading lever. It will be evident that when the loading lever is depressed both the upper and lower clips are moved clear of the cartridges. A spring H²⁷ is provided which moves the cut-offs back into their operative positions.

In the modification shown in Figs. 9 and 10 a cut-off is only provided at the bottom of the magazine but the cartridges are held back at the top of the magazine by being pressed up against a shoulder H²⁸ by a spring H²⁹. The spring H²⁹ is provided with a portion H³⁰ bent as shown. The bottom cut off H⁵ is of the same form as that described in connection with Figs. 5 and 6. On the loading lever being depressed to allow the next clip of cartridges to come into position, the cut-off H⁵ engages with the portion H³⁰ of the spring H²⁹ and depresses it so allowing the clip of cartridges to drop slightly and slip past the shoulder H²⁸.

In Figs. 11 to 15, an embodiment of the invention is shown in which it is applied to a machine-gun or automatic rifle. Referring to the drawings, A is the barrel of the gun, B the chamber and C the breech bolt; M¹ and M² are hoppers or magazines into which cartridges contained in clips are adapted to be placed. The two magazines M¹ and M² are similar in every respect, and the following description therefore applies to either:—H is a lever pivoted about H¹ and pressed by a spring H² in such a way that it moves the cartridges from the clip F¹ contained in the "loading chamber" into such a position that they are successively caught by the breech bolt C and forced into the firing chamber. After all the cartridges in the clip are fired, the clip is ejected through the opening I. The empty cartridge cases may be ejected through the opening I¹. In order to allow the next clip of cartridges to move into the loading chamber, it is necessary to provide means for returning the lever H to the position shown in full lines in Fig. 12. For this purpose, an arm N is pivoted about the spindle N¹, passing through the pivot H¹. The arm N can therefore move independently of the lever H in a plane perpendicular to the plane of Fig. 12, but partakes of the motion of the lever H in a plane parallel with that of Fig. 12. A spring O shaped substantially as shown in Fig. 13 is provided and a spring N² attached to the pivot H¹ and the arm N tends to press the latter up against the spring O. The barrel A of the gun which itself recoils on the firing of a shot is provided with a lug A¹. The lug A¹, when the barrel of the gun recoils after firing the last cartridge in the clip, engages with the arm N and carries it back until the spring H² is fully compressed which occurs just before the barrel has attained its maximum recoil. The lug and the lever N are so shaped and arranged that unless the last cartridge has been fired and consequently the lever H is in the position shown in chain lines in Fig. 12, the lug A¹ if it should engage at all with the lever N merely lifts the latter against the spring O without returning the lever H to the position shown in full lines in Fig. 12. The lever N is made short enough to allow the lug A¹ to slip past the end of it, when the lever H is in the position shown in full lines in Fig. 12. The object of this is to allow time for the new clip to fall into the loading chamber and for the lever H to force the cartridges into the loading position before the return of the bolt. The lug A¹ and the end of the arm N are curved as shown at $a$ and $n$ in Fig. 14 which is a side elevation of part of the barrel and the arm N. This enables the lug A¹ on its forward movement with the barrel to slip past the arm N should the latter be in its path. The parts A¹ and N have inclined faces at $a^1$ and $n^1$ respectively to prevent them when once engaged, from disengaging too early in their rearward movement. It is necessary to provide means for supporting the clip containing cartridges above the one immediately in use in the loading chamber, and devices for removing these supporting means when all the cartridges in the latter clip have been used, the combination constituting an escapement. For this purpose curved pieces P are employed. These curved pieces are attached to rods P¹ which are themselves joined by links P² and P³ to members P⁴. Attached to the lever H of the magazine M² for example, is an arm P⁵ which passes through slots P⁶ in the arms P⁴. As the lever H moves from the position shown in full lines (Fig. 12) to the position shown in dotted lines, the members P are reciprocated from the positions shown in full lines (Fig. 11) to the positions in dotted lines, so that when all the cartridges in the clip in the loading chamber are used, the next clip above it falls into place and a new clip is supported by the members P.

Though two magazines M¹ and M² have been shown, it is obvious that one or more than two might be employed. In the modification just described it is convenient to employ one magazine for supplying cartridges to the gun while the other is being refilled.

Instead of using a lever to move the cartridges onward in the loading chamber, a wheel having tooth-like projections might be employed, the tooth-like projections engaging with the cartridges and moving them into the required position.

One modification of such a form of wheel-feed as adapted for a machine gun and arranged according to my invention is shown in Figs. 16, 17 and 18. Supported on the barrel of the gun is a pawl Q which engages with a ratchet wheel Q¹, mounted on a spindle within an extension of the magazine.

when the barrel recoils after the shot is fired. Supported on the same spindle as the ratchet wheel $Q^1$ is a bevel wheel $Q^2$ which engages with a bevel wheel $Q^3$ attached to the spindle $Q^4$ beneath the magazine $M^1$. On the spindle $Q^4$ is a toothed wheel $Q^5$ the teeth of which pass up successively through a slot in the base of the magazine so as to engage with the cartridges and move them on to be caught by the breech block of the gun as the latter moves forward. A number of toothed wheels $Q^5$ are provided supported on stub axles $Q^6$. The stub axles are suitably geared together by toothed wheels $Q^7$. As in the modifications of this invention described in connection with Figs. 11, 12, 13 and 15, means for supporting the clip containing cartridges above the one immediately in use in the loading chamber may be provided.

Another modification of wheel feed is shown in Figs. 19 and 20. In place of a number of comparatively small toothed wheels $Q^5$ shown in the modification just described, one large wheel R is provided having movable teeth. The movable teeth consist of arms $R^1$ mounted on spindles $R^2$ attached to the wheel R. Springs $R^3$ tend to keep the arms $R^1$ in a substantially radial position relatively to the wheel R. As the wheel R is caused to rotate in the manner hereinafter described the arms $R^1$ come into contact with the casing $R^4$ forcing them into a more or less tangential position against the action of the springs $R^3$. At the top of the casing the arms $R^1$ are free to move to their radial position and they then engage with the cartridges G moving them onward until the foremost comes into position to be caught by the breech block of the gun as it moves forward. The wheel R is caused to rotate by a spring-pressed pawl S which engages with ratchet teeth $S^1$ on one side of the disk R. For operating the pawl S an arm $S^2$ suitably connected to the movable barrel of the gun impinges on one end of a bell-crank lever $S^3$, to the other end of which the spring-pressed pawl is pivoted. The wheel R is provided with cam surfaces $R^5$. These cam surfaces successively engage with a longitudinally movable rod $R^6$ which by its motion operates through a number of links the devices P which support the clips of cartridges in the magazine. The rod $R^6$ is pressed against the periphery of the wheel R by means of the helical spring $R^7$. The rod $R^6$ is connected to the forked end of an L-shaped link $P^7$ the other end of which is attached to the rod $P^1$ connected to the device P. The device P on the other side of the magazine is operated through link $P^8$ joined to the link $P^7$ as shown, a link $P^9$ pivoted at $P^{10}$, link $P^{11}$ and link $P^{12}$. It is obvious that by varying the shape and position of the cam surfaces $R^5$ the clips of cartridges can be arranged to fall at the exact moment required. Further by providing a stop T in the casing, as shown, the arms $R^1$ can be prevented from moving into the loading chamber before the new clip of cartridges has had time to fall thereinto.

A further modification of a type of wheel-feed according to my invention is shown in Figs. 21 and 22. The general mode of operation in this modification is the same as that described in connection with Figs. 16, 17 and 18 but instead of using a number of toothed wheels $Q^5$ a member U is provided having along one edge a number of projecting arms $U^1$, which passing through a slot in the base of the magazine engage with the cartridges therein. The teeth $U^1$ of the member U have a progressive motion given to them by means of the eccentrics $U^2$ actuated by means of the bevel wheel $Q^3$. For this purpose two spindles $Q^4$ and $Q^8$ geared together by spur wheels $Q^9$ operate the two eccentrics $U^2$. Devices P for supporting the clips of cartridges can of course be used in the manner described in connection with Figs. 11, 12, 13 and 15.

Various other modifications of this invention may obviously be made, for example, instead of moving the cartridges out of the clip, the cartridges and clip might be moved through the breech of the gun together or a combination of these movements might be adopted.

Though in the drawings and the corresponding description of this invention, the magazines have been shown and described as being "stationary" they might obviously be constructed in such a form as to be easily detachable from the gun.

What I claim as my invention and desire to secure by Letters Patent is:—

1. In a cartridge feed device for a gun the combination of a magazine adapted to receive a plurality of independent clips of cartridges at one end, means for feeding the independent clips of cartridges to the other end into position for the subsequent movement of the cartridges from the clips and means for moving the cartridges from the clips into position for firing.

2. In a cartridge feed device for a gun the combination of a magazine adapted to receive a plurality of independent clips of cartridges at one end, means for feeding the independent clips of cartridges to the other end into position for the subsequent movement of the cartridges from the clips and a lever for moving the cartridges into the path of the breech bolt of the gun.

3. In a cartridge feed device for a gun the combination of a magazine adapted to receive a plurality of independent clips of cartridges at one end, means for feeding the independent clips of cartridges to the other end into position for the subsequent movement of the cartridges from the clips, a lever for moving the cartridges successively into the path of the breech bolt and means for returning said lever after the cartridges in each clip are fired so as to allow the next clip of cartridges to come into position to be operated on by the said lever.

4. In a cartridge feed device for a gun the combination of a stationary magazine adapted to contain a plurality of cartridge clips a lever H for moving the cartridges successively into the path of the breech bolt an arm J attached to said lever H a spring J¹ attached to said arm J a projection j attached to said spring J¹, a slot L in the barrel, and a lug C¹ on the breech block, the projection j being adapted to pass into the slot L in the barrel and engage with the lug C¹ on the breech block after all the cartridges in the clip are fired for the purpose of moving the said lever H into such a position that the next clip of cartridges may come into position to be operated on by said lever H.

In testimony whereof I have signed my name to this specification in the presence of two subscribing witnesses.

ARTHUR BASIL CAREY.

Witnesses:
W. H. DERRIMAN,
HARRY B. BRIDGE.